United States Patent [19]
Betts

[11] Patent Number: 5,202,940
[45] Date of Patent: Apr. 13, 1993

[54] MODULAR ELECTRO-OPTIC BUS COUPLER SYSTEM

[75] Inventor: Robert Betts, Vestal, N.Y.

[73] Assignee: International Business Machines Corporation, Armonk, N.Y.

[21] Appl. No.: 832,194

[22] Filed: Feb. 6, 1992

Related U.S. Application Data

[63] Continuation of Ser. No. 654,472, Feb. 13, 1991, Pat. No. 5,131,061.

[51] Int. Cl.⁵ .............................. G02B 6/00; G02B 6/36
[52] U.S. Cl. .......................................... 385/24; 359/154
[58] Field of Search .................. 455/601, 610; 385/24, 385/25; 370/16, 58

[56] References Cited

U.S. PATENT DOCUMENTS

| | | | |
|---|---|---|---|
| 4,267,590 | 5/1981 | Bosotti | 370/3 |
| 4,451,916 | 5/1984 | Casper et al. | 370/16 |
| 4,479,701 | 10/1984 | Newton et al. | 350/96.16 |
| 4,511,207 | 4/1985 | Newton et al. | 350/96.16 |
| 4,727,601 | 2/1988 | Konishi | 455/612 |
| 4,776,658 | 10/1988 | Normandin | 350/96.15 |
| 4,837,856 | 6/1989 | Glista, Jr. | 455/601 |
| 4,845,722 | 7/1989 | Kent et al. | 370/58 |
| 4,961,620 | 10/1990 | Uken et al. | 350/96.15 |

*Primary Examiner*—Akm E. Ullah
*Attorney, Agent, or Firm*—Lynn L. Augspurger; Pryor A. Garnett

[57] ABSTRACT

The electrical/optical modular coupler enables terminal units coupled to it to be interconnected over the optical and/or electrical bus by which they are physically intercoupled. The modular coupler unit will have a plurality of modular active fiber optic coupler units; each modular active fiber optic coupler unit having an optical input port; an optical output port; an optical transmitter coupled to said optical output port; an optical receiver coupled to said optical input port, an electrical input port; an electrical output port; and logic control elements coupling the said optical transmitter, said optical receiver, said electrical output port and said electrical input port coupled for preventing any electrical input signal on said electrical input port from appearing at the electrical output port; but allowing an electrical input signal to be transmitted as an optical output signal and an electrical input signal to be transmitted as an optical output signal and allowing an optical input signal to become an electrical output; and the system has the electrical output ports of a modular coupler unit of the system coupled to the electrical input ports of a plurality of other couplers, and it the system may be coupled to an unlimited maximum of couplers with an optical signal appearing at any coupler input becoming an electrical signal output at that coupler and consequently becomes an electrical input at all of the other interconnected plurality of modular active fiber optic coupler units.

5 Claims, 5 Drawing Sheets

MODULAR ELECTRO-OPTIC BUS COUPLER SYSTEM

RELATED APPLICATION

This application is a continuation in part of U.S. Ser. No. 07/654,472 filed Feb. 13, 1991, entitled "Modular Active Fiber Optic Coupler System", now U.S. Pat. No. 5,131,061, issued Jul. 14, 1992.

FIELD OF THE INVENTIONS

This invention relates to fiber optic coupling circuitry, and particularly to a modular electrical and optical bus coupler extension to an existing electrical linear bus, which allows electrical and optical coupling of devices for electrical and optical bus-to-bus transmissions.

BACKGROUND OF THE INVENTIONS

There are two existing I.E.E.E. Standards for linear electrical data busses numbered 802.3 and 802.4. The difference between the two is the protocol and not the electrical bus interface. There is no available simple way to add optical terminals to these existing busses. There is such a need. In addition there is a need for both optical bus-to-bus transmissions, and optical-to-electrical and electrical-to-optical bus-to-bus transmissions.

In the field of linear data busses where fiber optics are employed it has been known to use fiber optics to connect terminals. U.S. Pat. No. 4,837,856, issued to Andrew Glista on Jun. 6, 1989 disclosed a fault-tolerant fiber optic coupler/repeater for use in a terminal in a high speed digital, audio or video (sometimes called a multi-modality) data transmission system which has an optical data input from one or a plurality of upstream terminals and which sends optical data to one or a plurality of downstream terminals via fiber optic lines. There is a bypass line which allows for a bypass of one or more upstream terminals.

U.S. Pat. No. 4,845,722 to Allan R. Kent et al, issued Jul. 4, 1989 disclosed a computer interconnect coupler which has a set of junctors which are assigned to channel transmitters and channel receivers for routing of messages from the channel receivers which are addressed to the channel transmitters. This computer interconnect coupler employed crossbar switching. A pair of interconnect couplers was provided which were linked together to ensure a mutually consistent definition of a virtual star coupling as well as to share diagnostic information. The patent does not disclose a fiber coupling or any way to allow a "virtual star coupling" to be accomplished by a fiber optic connector in a modular fashion.

Fiber optic circuitry has been employed in a number of specific ways. U.S. Pat. No. 4,511,207 to Steven A. Newton et al issued Apr. 16, 1985, proposed the use of a fiber optic data distributor with a one-by-n single mode optical fiber directional coupler to distribute data from a single fiber to a plurality of separate fibers. U.S. Pat. No. 4,479,701 to Steven A. Newton et al issued Oct. 30, 1984, disclosed a fiber optic recirculating memory which used dual couplers to form a splice free recirculating memory device from a single mode optical fiber much in the way delay line memories were formed during the early days of computer development. U.S. Pat. No. 4,451,916 to Paul W. Casper et al issued May 29, 1984, proposed a repeated, multi-channel fiber optic communication network for the use of fiber optics as a plurality of full duplex optic channels and one or more auxiliary channels for fault isolation. The system was intended for use in voice/digital data transmissions across the telephone network.

SUMMARY OF THE INVENTIONS

The present inventions are intended to be used as circuitry which permits a potentially infinite number of terminals or other devices on a network to be interconnected without having to redesign the fiber optical modular coupler for each system or number of lines on a bus and yet allows electrical to optical and optical to electrical bus-to-bus transmissions, as well as straight optical bus-to-bus transmissions.

As a result of my improvements the art can be provided with a common bus coupler for terminals to be connected to an electrical bus, which then can couple to a plurality of optical terminals by using at least one modular coupler having logic for providing optical bus to bus transmissions, and optical to electrical bus transmissions, and electrical to optical bus transmissions. This bus coupler is a modular coupler enabling terminal units coupled to it to be interconnected over the optical and/or electrical bus by which they are physically intercoupled, and from this coupler there can be terminals connected in a star configuration to the existing electrical bus, while taking advantage of the optical star for its advantages.

It is a further object of this invention to enable modular addition of any number of terminals with optical interfaces without changing the electrical design in any way. Further, the objective is achieved which enables the coupling to be compatible with both of the I.E.E.E. Standards 802.3 and 802.4. The present invention may be used with modules which allow the addition of a plurality of optical modules, and which, in the preferred embodiment would allow the addition of eight optical terminals for a coupler tap.

The modular connection can be implemented for a fiber optic data bus which has a plurality of signal lines interconnecting various devices in a network. The fiber optic coupler allows unlimited growth and is modular. A system which employs the modular active coupler which I have invented permits interconnection of various numbers of terminal devices without any maximum limit to a fiber optic data bus without regard to any bus protocol and without having to redesign the coupling for each new system. No active fiber optic coupler has been proposed which solves this problem.

The system which I have developed uses the same modular fiber optic active coupler unit. Thus, each network system would have a plurality of modular active fiber optic coupler units; each modular active fiber optic coupler unit having an optical input port; an optical output port; an optical transmitter coupled to said optical output port; an optical receiver coupled to said optical input port, an electrical input port; an electrical output port; and logic control elements coupling the said optical transmitter, said optical receiver, said electrical output port and said electrical input port coupled for preventing any electrical input signal on said electrical input port from appearing at the electrical output port; but allowing an electrical input signal to be transmitted as an optical output signal and allowing an optical input signal to become an electrical output; and the system has one of said electrical output ports of a modular coupler unit of the system being coupled to the electrical input ports of a plurality of other couplers, one of the electrical output ports of a second of said modular coupler units being coupled to the electrical input ports of the other modular coupler units, while one electrical output port of the other modular units is coupled to the electrical input port of the first coupler; said couplers being adapted to transmit therebetween optical signals for coupled devices whereby an optical signal appearing at any coupler optical input becomes an electrical signal output at that coupler and consequently becomes an electrical signal input to all other interconnected plurality of modular active fiber optic coupler units.

BRIEF DESCRIPTION OF THE DRAWINGS

The inventions will be described now in greater detail with reference to the separate sheets of numbered appended drawings in which.

DETAILED DESCRIPTION OF THE PREFERRED EMBODIMENTS

Turning now to the drawings in greater detail, in order to illustrate this invention, I will first describe the same kind of modular coupler which can be used as a star coupler configuration as illustrated as the aforementioned related application, U.S. Ser. No. 07/654,472, now U.S. Pat. No. 5,131,061.

Figure 1:
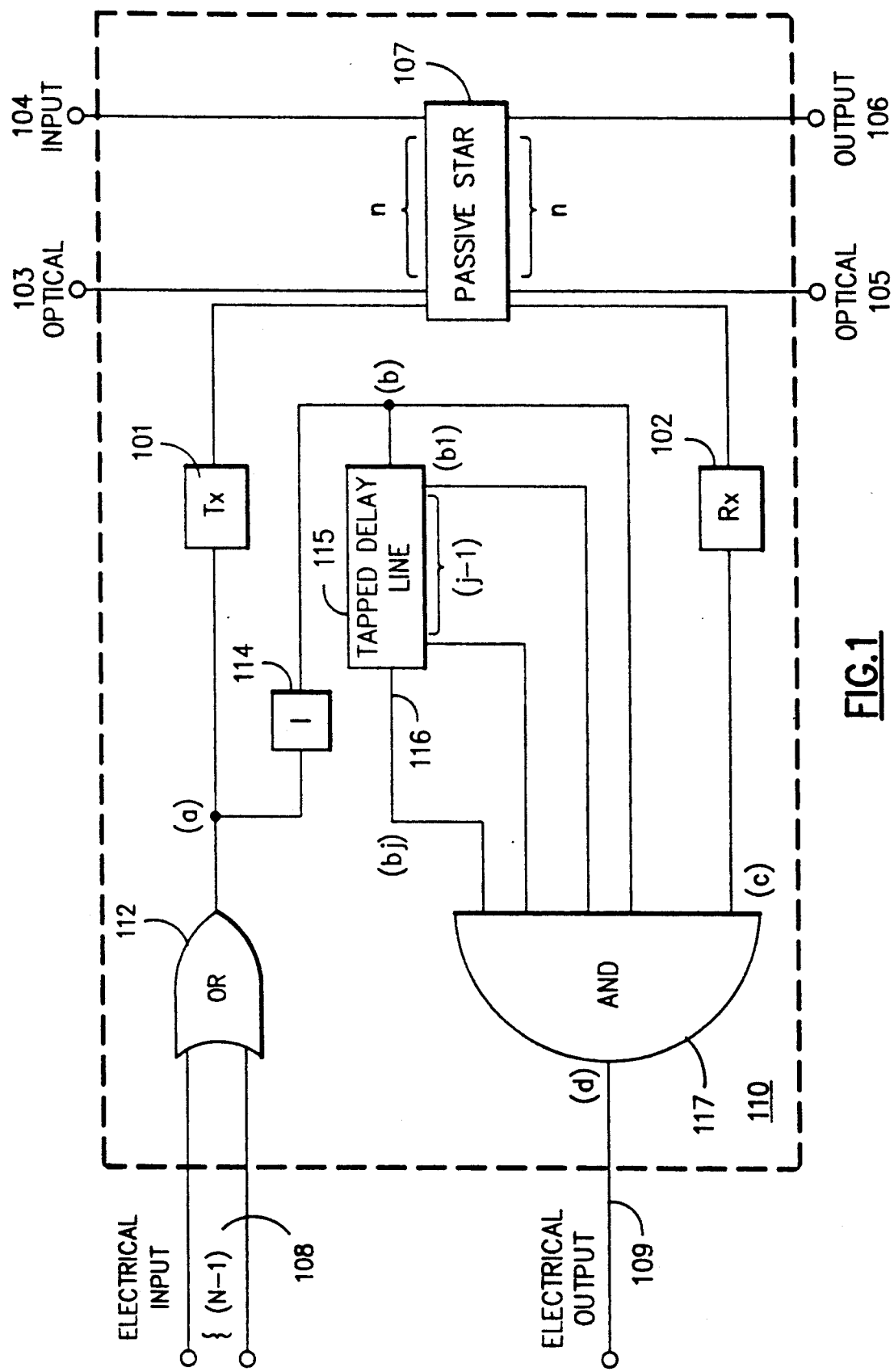
FIG. 1 illustrates generally my preferred embodiment of a basic active coupler with delay requirements among the logical elements.

FIG. 1 shows a block diagram of the basic active coupler with delay requirements among the logical elements. There is provided in each active coupler a function optical transmitter Tx (101) and a functional optical receiver Rx (102) as functional elements of the modular active fiber optic coupler 110. The functional elements may comprise for example for the transmitter element Tx a semiconductor laser or light emitting diode LED. As illustrated by element Rx the functional optical receiver element may be a photodiode with amplifier. Functional element Tx acts as a transmitter, and Rx functions as a receiver, respectively. The input to the Tx element 101 is a logic level signal. Similarly, the output of the Rx element 102 is a logic level signal. The purpose of the internal electrical logic control is to prevent any electrical input signal from appearing at the electrical output, but to allow the electrical signal input to become an optical output and to allow an optical input to become an electrical output.

The modular active coupler 110 in accordance with my preferred embodiment has a plurality of optical input connection ports 103, 104 etc. fiber optic signal line ports of the fiber optic bus which connects to the port coupling to an optical communication network. The modular active coupler 110 also has a plurality of lines coupled to the couplers as optical output connection bus ports 105, 106, for couplings to an optical communication network with the ports connected to the internal electrical logic control of the active modular coupling and to each other by a passive star connector having n port nodes 107 bridging the optical input/output busses under control of the electrical logic. Accordingly, the optical input and output per coupler should be understood to be n ports, matching the number of lines. Each system can have N couplers without a maximum number of couplers in the system.

The number of electrical inputs 108 to the optical active coupler 110 is N−1. These are coupled to the logic control within the coupler. An electrical output is provided for the coupler. These electrical inputs and output are ports provided for interconnecting the coupler to multiple couplers. The electrical output 109 is provided as a port to a terminal device of the system which is addressed. Only the addressed terminal device has anything to do with the electrical output signal of the logic control.

FIG. 1 shows a modular active fiber optic coupler which can be used in optical to optical bus connections. As seen in FIG. 1, the logic control is provided with a coupling to the transmitter and receiver, and an OR gate 112 is coupled to the input ports 108 of the coupler for receiving electrical input signals from another active modular coupler.

An AND gate 117 is provided for the logic control and is coupled to the electrical output port 109 for coupling to another modular active coupler element. The output of the OR gate 112 is connected to the transmitter Tx and through the transmitter a passive coupling to the optical output ports. The signal emanating from the OR gate is inverted by inverter 114 and functions as an inverted input to a tapped delay line 115 to which it is coupled. A plurality of outputs j-1, where j is equal to the number of taps on the delay line, as well as a tapped delay line control out signal line 116, is shown for the tapped delay line 115. The input of the tapped delay line emanating from the OR gate and the outputs of the tapped delay line, function as inputs to AND gate 117, as well as the coupled output of the receiver Rx. The tapped delay line control out signal line 116 gates the AND gate off. As coupled to OR gate the delay line blocks any electrical input and prevents it from becoming an electrical output. The receiver's optical input is coupled to the control port of the passive coupling, as is the optical output of the transmitter. The delay from the OR gate through the transmitter to the receiver to the AND gate is greater than the electrical delay from the OR gate to the AND gate through the electrical tapped delay line of the electrical logic control. The timing of the optical delay less the electrical delay is less than or equal to the maximum time between signal transitions. With regard to timing considerations, $\frac{1}{2}$ the minimum baud time should be considered as the practical limit of the number of taps on the delay line. Accordingly the total delay line time should equal the maximum time between signal transitions plus $\frac{1}{2}$ of the baud time of the transmission network. Power, not shown, is provided for the electrical elements.

When coupled to one another a plurality of X modular active couplers are capable of connecting Xn (X couplers having n terminals) terminal devices, where n represents the number of input/output lines of the bus port of the coupler. This may be illustrated by FIG. 2 which shows a three coupler system interconnecting 3 couplers each having n terminals.

Figure 2:
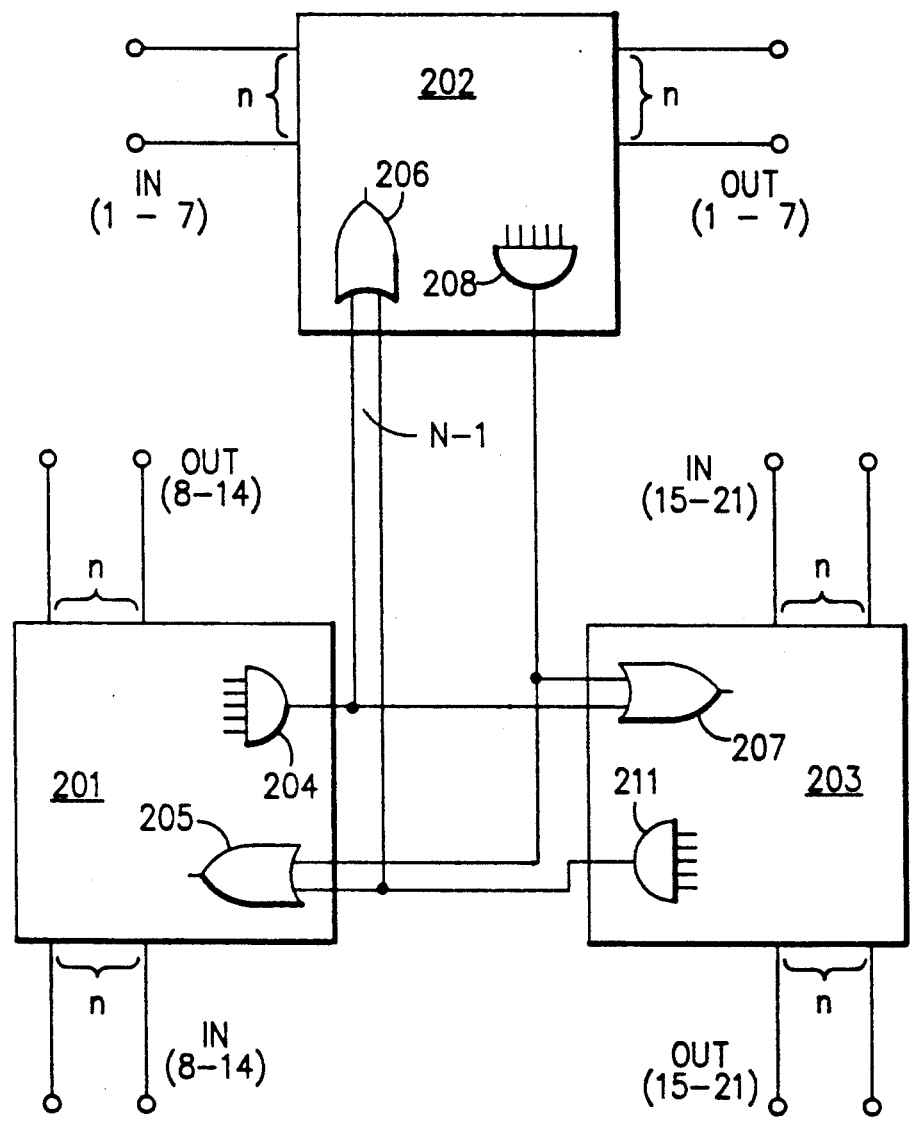
FIG. 2 illustrates a three coupler system interconnecting 3n terminals.

As shown in FIG. 2 the modular active couplers are provided each with seven fiber optic input/output port lines. The electrical output 204 of coupler 201 is coupled to the electrical inputs 206, 207 of couplers 202, 203 respectively. Similarly, coupler electrical output port 208 is coupled to the electrical input ports of coupler 201, 203, while electrical output port 211 is connected to the electrical input port 205, 206 of couplers 201, 202. Accordingly, an optical signal appearing at any coupler input becomes an electrical signal output at that coupler and consequently becomes an electrical input at all of the other interconnected couplers. Were it not for the internal logic control of the coupler these electrical inputs would also become electrical outputs at all of the couplers and would also keep circulating potentially forever among the various terminals on the bus. Since the bus traffic is "bursty" data, the Tx/Rx combinations are effectively dc coupled. The purpose of the delay line is to overlap signals at the input to the "AND" circuit such that it will block any electrical input signal from becoming an electrical output.

Figure 3:
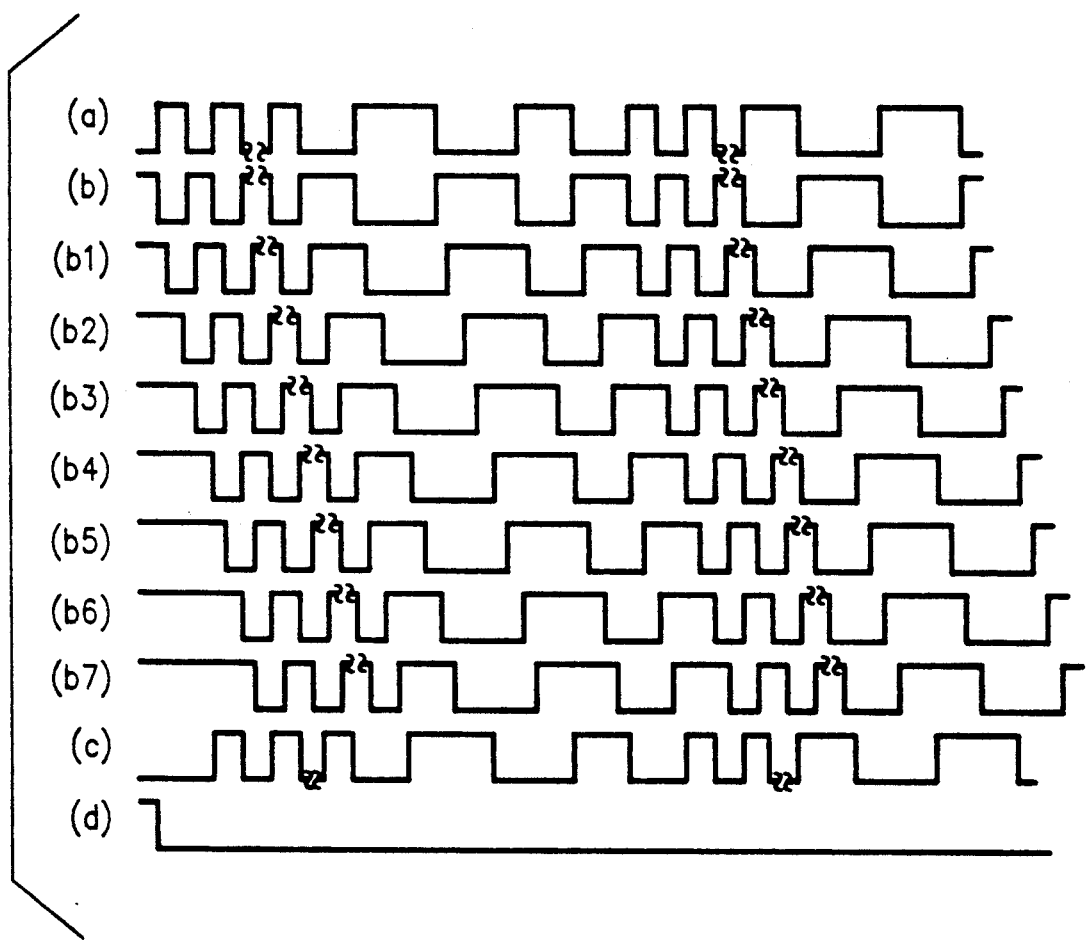
FIG. 3 shows as an example waveforms for a fiber optic bus application.

FIG. 3 shows waveforms for the currently preferred fiber optic bus application, illustrated by way of example. The timing discussed hereinbefore with reference to FIG. 1 is tied by common reference alphabetic identification (a), (b), (b1), (b2), (b3), (b4), (b5), (b6), (b7), (c) and (d) to the signal lines shown in FIG. 3. Signal (c) is understood to be blocked at 301, while signal (d) is the signal emanating from the final gate.

BUS TO BUS TRANSMISSIONS

It can be recognized that the foregoing can perform the functions of an optical star coupler when configured as described above. However, the need or desire would be to use this star coupler for electrical buses with a tap to the existing electrical bus. With the present invention as further illustrated with respect to the FIG. 3–6 described below, this is now possible. Compatible commercial or industrial lans include CONTROLNET (Siemens-Allis); DATA FREEWAY (Measurex); DECNET (Digital Equipment); ethernet (Xerox, IBM, and many others); GENET (General Electric); LAN 9000 (Hewlett-Packard); MAP (General Motors); TIWAY II(Texas Instruments); TOKEN/NET (Concord Data Systems); VISTANET (Allen Bradley) and XODIAC (Data General). In addition, my bus coupler may be used in many military and commercial aircraft applications.

In accordance with the invention, in my preferred embodiment, a linear electrical bus has "taps" where a receiver and a transmitter associated with each terminal on the bus are attached and can thus communicate with any other electrical terminal over an electrical bus which is attached and can thus communicate with any other terminal on the bus through the electrical connections which constitute the bus.

The preferred embodiment of this invention has means whereby a number of optical input/output interfaces constitute a modular active fiber coupler of the star type which has been illustrated above. The modular active star coupler can be interconnected by means of an optical-to-optical bus. The same modular active star coupler can be interconnected by means of a separate electrical bus to extend the number of terminals with optical interfaces which can be attached to an optical bus. Because each modular coupler has an electrical input and an electrical output, it can be attached to an existing linear electrical bus with compatible electrical "tap" interfaces, in accordance with I.E.E.E. standards 802.3 and 802.4, which current published standards are incorporated herein by reference.

Each of the several IEEE 802.3 and 802.4 busses use basically the same electrical configuration for interconnection. Physically, the bus is a pair of electrical conductors (twisted pair, coax, printed circuit wiring, etc.) which are tapped into at points along the conductors where a terminal is located. The bus is usually terminated in its characteristic impedance in order to suppress reflections. Both the output of a line driver and the input to a line receiver are connected at the tap. The digital information is logic level voltage variation with amplitudes depending on the logic circuit family being used. On a tap where the terminal is putting information on the bus, the receiver is also accepting the same information. Internal to the terminal, input and output data is separated and the fact that the terminal is receiving its own transmitted data is not detrimental. In the case of the modular coupler, however, when its electrical output is putting information on the electrical bus, the modular coupler electrical input must be prevented. This has been explained above. When the electrical connection between the modular coupler and the existing electrical bus is only a single pair of conductors, as with 802.3 and 802.4, the logic for preventing the electrical output from being an electrical input to the same coupler is different from that described in FIG. 1, but instead is as described in FIG. 4.

Figure 4:
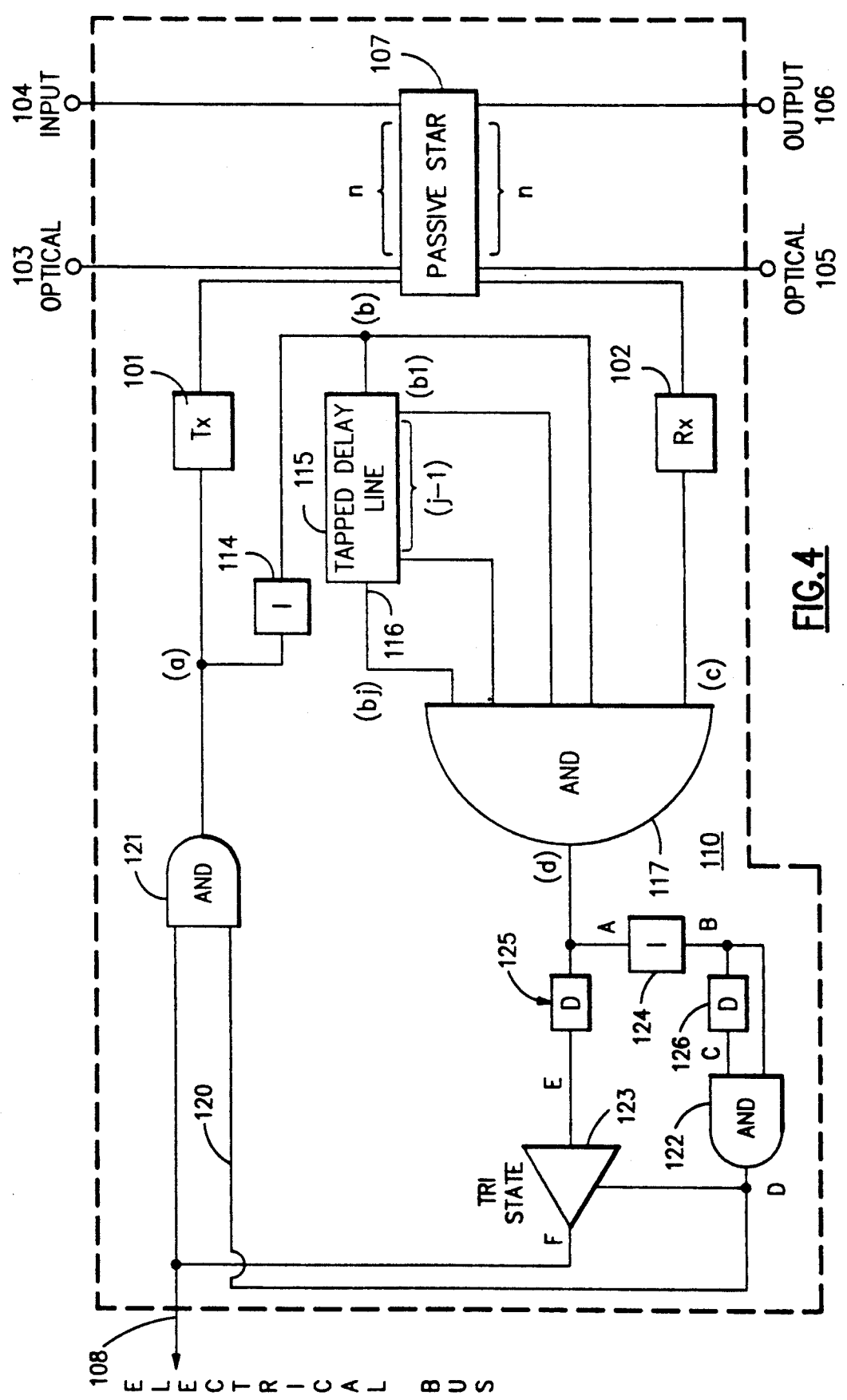
FIG. 4 shows my current preferred embodiment for the bus coupler for coupling bus to bus both electrical and optical bus connected terminals, and modifies the coupler of FIG. 1.

FIG. 1 has been modified for use when an electrical connection is to be made, as shown in FIG. 4. As seen in FIG. 4, the logic control is provided with a coupling to the transmitter and receiver, and, instead of an OR, an AND gate 121 is coupled to the electrical input port 108 of the coupler for receiving electrical input signals from another active modular coupler or from an electrical terminal via the electrical bus 108.

An AND gate 117 is provided for logic control and is coupled to the electrical bus 108 and an input to AND gate 121 through logic consisting of AND gate 122, tri-state driver 123, inverter 124 and delays 125 and 126. The purpose of this additional logic is to prevent any output from AND gate 117 from appearing at the inputs to the transmitter Tx 101 and inverter 114. Except for these additions for electrical couplings to the electrical bus at the tap, the logic control of the modular coupler is the same as illustrated in FIG. 1, and the same logic is illustrated in FIG. 4.

Figure 5:
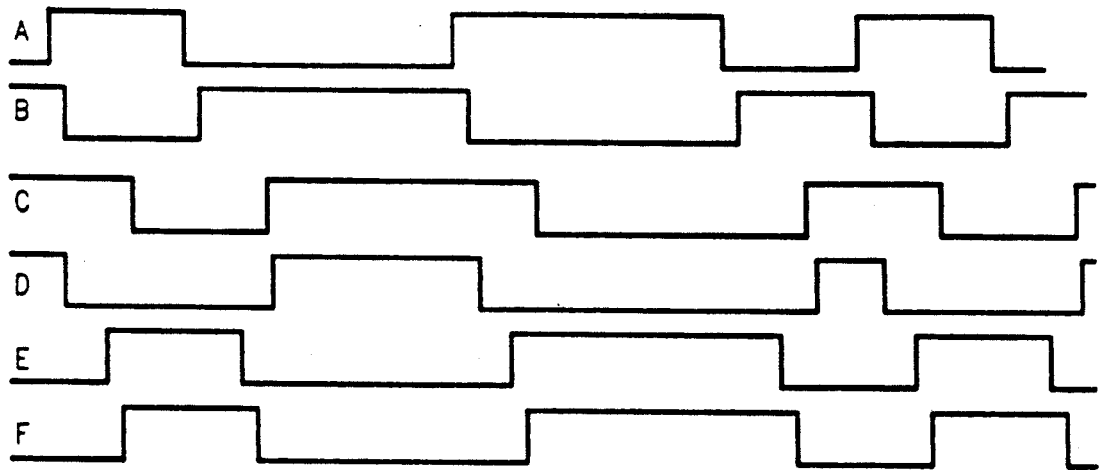
FIG. 5 shows as an example waveforms for the electro-optic bus application.

FIG. 5 shows the waveforms at points within this additional logic at points A, B, C, D, E and F. Points D and F are the inputs to AND gate 121. It can be seen that the waveform at point D will prevent the electrical output at point F (bus 108) from reentering the system.

Figure 6:
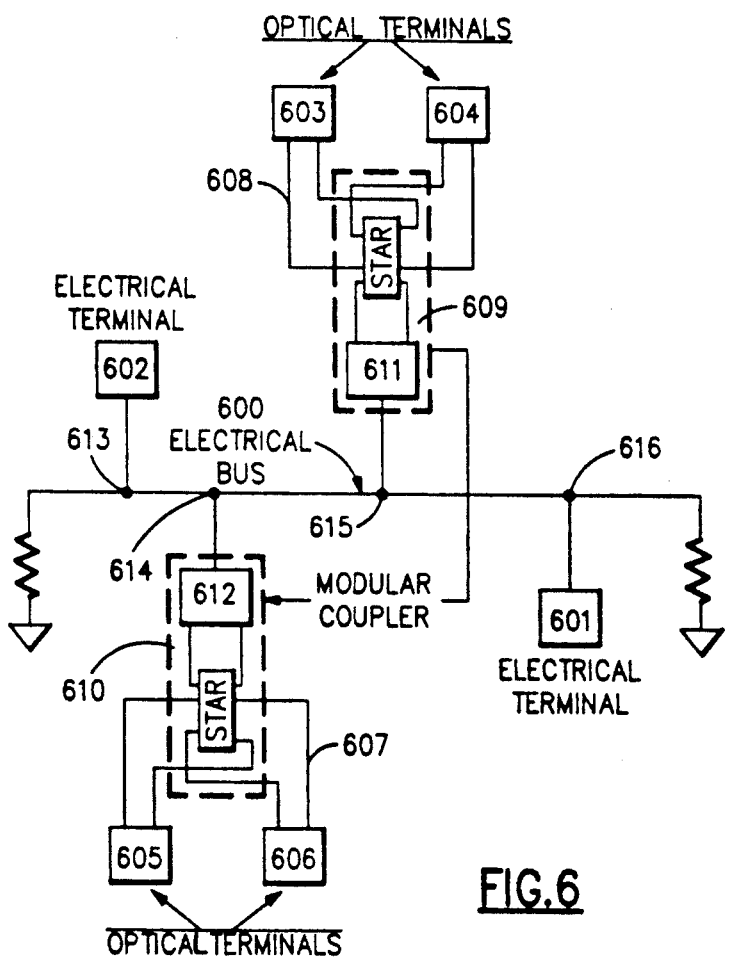
FIG. 6 shows as an example a system for coupling plural terminals to an electrical bus via the electro-optic coupler.

FIG. 6 shows an electrical bus 600 with both electrical 601, 602 and optical 603, 604, 605, 606 terminals coupled to it with the bus coupler of the preferred embodiment. Optical buses 607 and 608 are connected to the electrical bus 600 via modular couplers 609 and 610. These couplers are encompassed within the dotted line blocks of FIG. 6. The logic shown in FIG. 4 is illustrated in FIG. 6 by the bus coupler elements 611 and 612. Nodes 613, 614, 615 and 616 illustrate the taps to the electrical bus 600.

As the preferred embodiment can be used as circuitry which permits a potentially infinite number of terminals or other devices on a network to be interconnected without having to redesign the fiber optical modular coupler for each system or number of lines on a bus and yet allows electrical to optical and optical to electrical bus-to-bus transmissions, as well as straight optical bus-to-bus transmissions, the coupler unit can be attached to any standard electrically compatible linear bus and allow extension of the electrical bus to groups of terminals with optical interfaces which use the same protocol.

This coupler will have an optical input port; an optical output port; an optical transmitter coupled to said optical output port; an optical receiver coupled to said optical input port; an electrical input port; an electrical output port; and logic control means coupling the said optical transmitter, said optical receiver, said electrical output port and said electrical input port for preventing any electrical input signal on said electrical input port from appearing at the electrical output port, but allowing an electrical input signal to be transmitted as an optical output signal and allowing an optical input signal to become an electrical output. By connecting the optical output port to an input port of a passive star coupler and connecting an output port of the passive star coupler to the optical input port, multiple optical interfaces are allowed access to a linear electrical bus via the electrical ports of the coupler.

Also, the current preferred embodiment of my invention has a characteristic that any optical input becomes both an optical output and an electrical output. Also, any electrical input becomes an optical output but does NOT become an electrical output. This later characteristic is necessary to prevent signals coming from other modular couplers or terminals on the electrical bus to which the coupler is attached from recirculating endlessly on the system.

As a result of my improvements we now have a way for attaching terminals with optical interfaces to an existing electrical linear bus. Via use of the modular active fiber coupler an interface with a linear optical bus with multiple terminals. In my preferred embodiment there could be as many as eight additional terminals attached to a standard electrical linear bus with each modular bus coupler, with more provided with additional bus couplers due to the modularity of the system, without changing, for the eight, the design of either the optical linear bus which I have described or the standard linear bus which would be used.

While it is possible that an electro/optical interface could be established for each terminal of the system by use of an electrical and optical transmitter/receiver, by using the above described invention, the hardware is reduced by a significant amount. The cost is significantly reduced, and the reliability of the system is increased.

While I have disclosed these inventions by way of illustration of the preferred embodiment, the accompanying claims should be understood to encompass all the breadth that can be construed, protecting the inventions to the fullest extent possible under the law in light of existing prior work of others. Those skilled in the art upon reading this disclosure, both now and in the future, will undoubtedly conceive of further adaptations and improvements, even by way of invention, which fall within the intended scope of the claims.

What is claimed is:

1. A coupler for connecting terminals to an electrical bus, said terminals being coupled by an optical bus, said coupler comprising:
   optical input ports;
   optical output ports;
   an optical transmitter coupled to one of said optical input ports;
   an optical receiver coupled to one of said optical output ports;
   an electrical input port;
   an electrical output port;
   logic control means coupling said optical transmitter, said optical receiver, said electrical output port and said electrical input port for preventing any electrical input signal on said electrical input port from appearing at the electrical output port, but allowing an electrical input signal to be transmitted as an optical output signal and allowing an optical input signal to become an electrical output and an optical output; and
   means physically configured for plugging into said electrical bus so as to couple said terminals to said electrical bus for optical-electrical bus-to-bus transmissions.

2. A coupler according to claim 1 wherein any optical input becomes both an optical output and an electrical output, and any electrical input becomes an optical output but does NOT become an electrical output.

3. A coupler according to claim 1 wherein said logic control means includes an OR gate coupled to receive signals via said electrical input port, and an AND gate coupled to said electrical output port for transmitting via said electrical output port an electrical signal, and internal electrical logic means for overlapping signals at the input to the AND gate such that said internal electrical logic means blocks any electrical signal from becoming an electrical output signal, while permitting an electrical input signal to be converted to an optical output signal by said optical transmitter for transmission via said optical output port.

4. A coupler according to claim 1 wherein a logic delay line means provided for said logic control means blocks any electrical input signal from becoming an electrical output signal, while permitting an electrical input signal to be converted to an optical output signal by said optical transmitter for transmission via said optical output port.

5. A coupler according to claim 3 wherein delay means are provided for said logic control means whereby the delay from said OR gate through the transmitter to said receiver and to the coupled AND gate is greater than the electrical delay from the OR gate to the AND gate through the electrical delay means, and wherein the timing of the optical delay less the electrical delay is less than or equal to the maximum time between signal transitions.

* * * * *